United States Patent
Cohen (10) Patent No.: US 9,112,731 B2
(45) Date of Patent: *Aug. 18, 2015

(54) PRIORITIZATION OF INCOMING COMMUNICATIONS

(71) Applicant: Google Inc., Mountain View, CA (US)

(72) Inventor: Gabriel Aaron Cohen, Alameda, CA (US)

(73) Assignee: Google Inc., Mountain View, CA (US)

( * ) Notice: Subject to any disclaimer, the term of this patent is extended or adjusted under 35 U.S.C. 154(b) by 350 days.

This patent is subject to a terminal disclaimer.

(21) Appl. No.: 13/691,265

(22) Filed: Nov. 30, 2012

(65) Prior Publication Data

US 2013/0311579 A1 Nov. 21, 2013

Related U.S. Application Data

(63) Continuation of application No. 13/475,318, filed on May 18, 2012, now Pat. No. 8,346,881.

(51) Int. Cl.
*G06F 15/16* (2006.01)
*H04L 12/58* (2006.01)
*G06Q 10/10* (2012.01)
*H04L 12/851* (2013.01)
*H04L 12/841* (2013.01)

(52) U.S. Cl.
CPC .......... *H04L 12/581* (2013.01); *G06Q 10/107* (2013.01); *H04L 47/2433* (2013.01); *H04L 47/28* (2013.01)

(58) Field of Classification Search
USPC ....... 709/206, 224; 707/1; 435/226; 340/7.51
See application file for complete search history.

(56) References Cited

U.S. PATENT DOCUMENTS

| | | | |
|---|---|---|---|
| 6,980,993 B2 | 12/2005 | Horvitz et al. | |
| 7,565,403 B2 | 7/2009 | Horvitz et al. | |
| 7,634,528 B2 | 12/2009 | Horvitz et al. | |
| 7,698,276 B2 | 4/2010 | Seshadri et al. | |
| 7,844,666 B2 | 11/2010 | Horvitz et al. | |
| 8,019,834 B2 | 9/2011 | Horvitz et al. | |
| 8,346,881 B1 | 1/2013 | Cohen | |
| 8,788,602 B1 * | 7/2014 | Wan | 709/224 |
| 2002/0102705 A1 * | 8/2002 | Pinto et al. | 435/226 |
| 2002/0120705 A1 | 8/2002 | Schiavone et al. | |
| 2002/0141555 A1 | 10/2002 | Kim | |

(Continued)

OTHER PUBLICATIONS

International Search Report and Written Opinion of international application No. PCT/US2013/041632, mailed Feb. 25, 2014, 10 pp.

(Continued)

*Primary Examiner* — Quang N Nguyen
(74) *Attorney, Agent, or Firm* — Shumaker & Sieffert, P.A.

(57) ABSTRACT

The subject matter of this disclosure can be implemented in, among other things, a method performed by a computing device. In these examples, the method includes determining an identity of an originator of an incoming communication using an originating address of the incoming communication, and applying a first set of rules to the identity of the originator of the incoming communication to determine an importance of the incoming communication. The first set of rules includes rules generated based at least on information about the originator included in a directory of the computing device. The method may also include applying a second set of rules to the identity of the originator. The second set of rules includes rules generated based at least on previous interactions between the computing device and the originator.

20 Claims, 5 Drawing Sheets

(56) References Cited

U.S. PATENT DOCUMENTS

| | | |
|---|---|---|
| 2003/0041048 A1* | 2/2003 | Balasuriya ................ 707/1 |
| 2003/0046421 A1 | 3/2003 | Horvitz et al. |
| 2004/0039786 A1 | 2/2004 | Horvitz et al. |
| 2004/0068481 A1 | 4/2004 | Seshadri |
| 2004/0199663 A1 | 10/2004 | Horvitz et al. |
| 2005/0064854 A1 | 3/2005 | Jang |
| 2005/0248437 A1* | 11/2005 | Hellebust et al. ............ 340/7.51 |
| 2006/0240877 A1 | 10/2006 | Filiba et al. |
| 2009/0088168 A1 | 4/2009 | Varanasi |
| 2009/0214017 A1 | 8/2009 | Koch |
| 2009/0299934 A1 | 12/2009 | Horvitz et al. |
| 2009/0311999 A1 | 12/2009 | Sarkar et al. |
| 2010/0115420 A1 | 5/2010 | De Gibon et al. |
| 2012/0124146 A1* | 5/2012 | Hsiao et al. ............... 709/206 |
| 2013/0041956 A1* | 2/2013 | Davenport et al. .......... 709/206 |
| 2013/0041957 A1* | 2/2013 | Davenport et al. .......... 709/206 |

OTHER PUBLICATIONS

Notice of Allowance from U.S. Appl. No. 13/475,318, dated Aug. 27, 2012, 19 pp.

International Preliminary Report on Patentability from international application No. PCT/US2013/041632, dated Nov. 27, 2014, 7 pp.

* cited by examiner

PRIORITIZATION OF INCOMING COMMUNICATIONS

RELATED APPLICATION

This application is a continuation of U.S. patent application Ser. No. 13/475,318, filed May 18, 2012, issued as U.S. Pat. No. 8,346,881 on Jan. 1, 2013, the entire content of which is hereby incorporated by reference.

TECHNICAL FIELD

This disclosure relates to computing devices and, more particularly, to computing device notifications of incoming communications.

BACKGROUND

Computing devices may be utilized for telephonic, email, and short messaging service (SMS) communications. Conventionally, computing devices, such as cellular telephones, have produced notification of incoming communications. When computing devices receive an incoming communication, they often provide an alert to the user of the incoming communication. For example, such devices may provide alerts such as an audio tone, a visible alert such as a blinking light, or a physical cue such as vibration.

SUMMARY

In one example, a method performed by a computing device having at least one processor includes determining an identity of an originator of an incoming communication using an originating address of the incoming communication, and applying a first set of hierarchical rules to the identity of the originator of the incoming communication to determine an importance of the incoming communication. The first set of hierarchical rules includes hierarchical rules generated based at least on information about the originator of the incoming communication included in a directory of the computing device. The directory includes information about potential originators of incoming communications based on a location of each of the potential originators. The method further includes applying a second set of rules to the identity of the originator of the incoming communication to determine the importance of the incoming communication, wherein the second set of rules comprise rules generated based at least on previous interactions between the computing device and the originator of the incoming communication, and generating a prioritization score based on the importance determined by the first and second sets of rules.

In another example, a computer readable medium encoded with instructions that if executed by one or more programmable processors of a computing device cause the computing device to perform operations including determining an identity of an originator of an incoming communication using an originating address of the incoming communication, and applying a first set of hierarchical rules to the identity of the originator of the incoming communication to determine an importance of the incoming communication. The first set of hierarchical rules includes hierarchical rules generated based at least on information about the originator of the incoming communication included in a directory of the computing device. The directory includes information about potential originators of incoming communications based on a location of each of the potential originators. The operations further include applying a second set of rules to the identity of the originator of the incoming communication to determine the importance of the incoming communication, wherein the second set of rules comprise rules generated based at least on previous interactions between the computing device and the originator of the incoming communication, and generating a prioritization score based on the importance determined by the first and second sets of rules.

In another example, a system includes one or more processors, a directory, an originator identification module, and a message prioritization module. The directory is configured to store information about potential originators of incoming communications based on a location of the potential originators. The originator identification module identifies an originator of an incoming communication using an originating address of the incoming communication. The message prioritization module is operable by the one or more processors to apply a first set of hierarchical rules to the identity of the originator of the incoming communication to determine an importance of the incoming communication, wherein the first set of hierarchical rules includes hierarchical rules generated based at least on information about the originator of the incoming communication included in a directory of the computing device, apply a second set of rules to the identity of the originator of the incoming communication to determine the importance of the incoming communication, wherein the second set of rules comprise rules generated based at least on previous interactions between the computing device and the originator of the incoming communication, and generate a prioritization score based on the importance determined by the first and second sets of rules The details of one or more embodiments are set forth in the accompanying drawings and the description below. Other features, objects, and advantages will be apparent from the description and drawings, and from the claims.

DETAILED DESCRIPTION

In computing devices, such as cellular telephones, configured to receive incoming communications, the receipt of an incoming communication may interrupt the activities of the recipient of the message. In addition to the disturbance caused by the alert generated by the computing device when the incoming communication is received, the recipient may need to physically check the computing device to determine whether to answer or ignore the incoming message. The activity of the recipient, whether or not coupled with an audible, tactile, or visual alert from the computing device, may annoy others around the recipient and lead to frustration on the part of all concerned as the recipient stops what they were doing to consult the computing device.

In accordance with techniques of this disclosure, one or more sets of hierarchical rules may be applied to the identity of the originator of the incoming communication to generate a prioritization score for the incoming communication. An originator of an incoming communication is a person, business, or other entity associated with the incoming communication and that initiated the incoming communication. An example hierarchical rule set may be based on a location of the originator of the incoming communication, e.g., the physical or social location of the originator with respect to the recipient of the incoming communication. Social location refers to the social relationships between the originator and the recipient of the incoming communication. These relationships may include familial, friendships (and popularity amongst friends), quality of service, popularity in the community, and so on. Another example hierarchical rule set may be based on previous interactions between the originator and recipient of the incoming communication.

Various aspects of this disclosure may provide one or more advantages. For example, by prioritizing the incoming communication, the recipient of the communication may be alerted to the nature of the originator of the incoming communication or whether the significance of the communication warrants interrupting the activities of the recipient. Further, messages of low importance may be automatically processed without disturbing the recipient, or those around the recipient. As another example, techniques of this disclosure may also provide the recipient with additional information about the originator of the incoming communication or the incoming communication itself beyond the basic identity and contact information of the originator, which may enable the recipient to make a more informed decision as to whether to answer the incoming communication.

Figure 1:
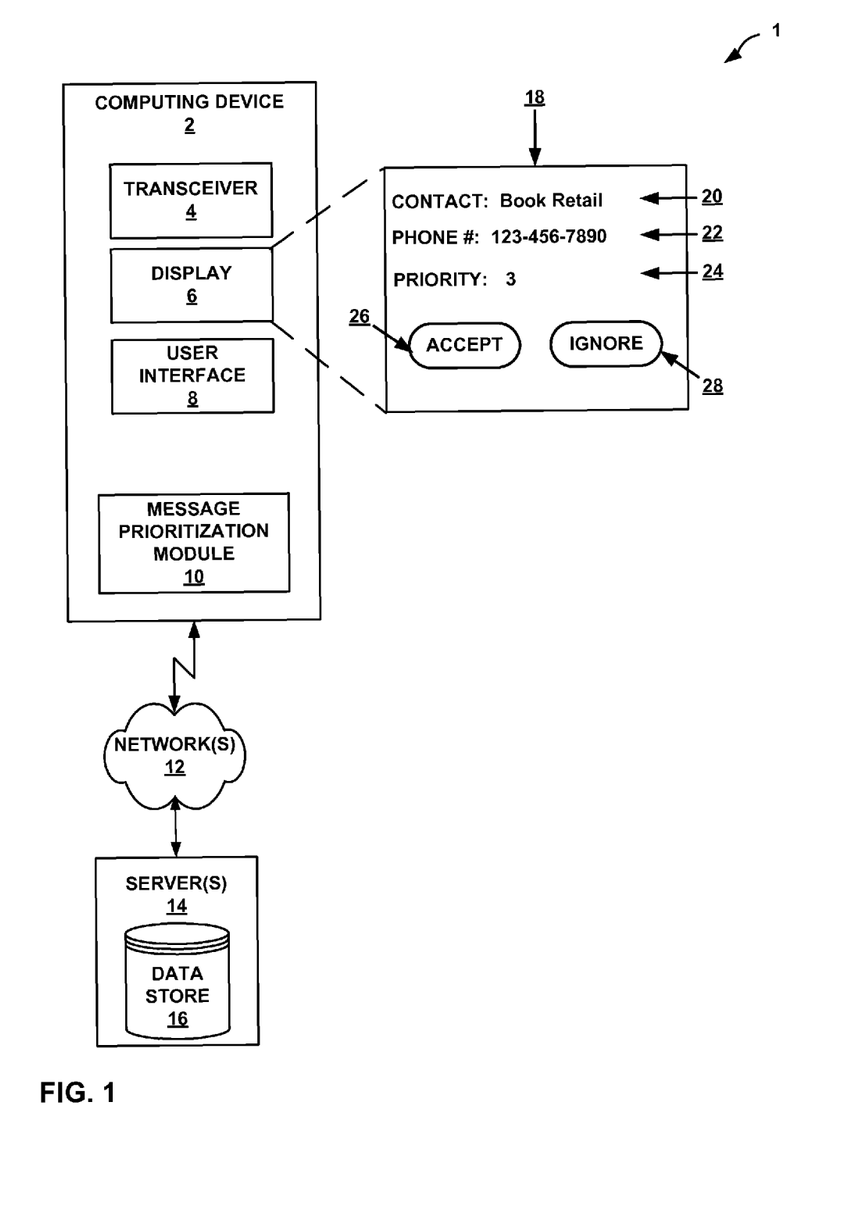
FIG. 1 is a block diagram illustrating an example system for prioritization of incoming communications.

FIG. 1 is a block diagram illustrating an example system 1 for prioritization of incoming communications. As shown in FIG. 1, example system 1 includes computing device 2, network 12, and server 14.

Examples of computing device 2 may include, but are not limited to, portable or mobile devices such as cellular phones, personal digital assistants (PDAs), portable gaming devices, portable media players, and e-book readers, as well as non-portable devices such as desktop computers. Other examples of computing device 2 may include standard telephones and other devices that may be configured to receive a communication. A communication may include, but is not limited to, telephonic message, a voice or digitized voice message, or video transmission as well as text based messaging, such as short message service (SMS) text, instant messaging, and other examples.

Computing device 2 is coupled to network 12 via wired or wireless links or both. Network 12 may include a telephone network such as a cellular telephone network, a wide-area network such as the Internet, a local-area network (LAN), an enterprise network, or one or more other types of networks. Computing device 2 may communicate using voice connections or may transmit and receive data using network 12. In some examples, network 12 may include one or more different networks. For instance, computing device 2 may communicate with an originator of an incoming communication using a cellular telephone network and computing device 2 and server 14 may communicate using a LAN or a public network, such as the Internet.

Server 14 may include one or more servers located in network 12. Server 14 may include data store 16, which may be configured to store one or more directories accessed by computing device 2 via network 12 and server 14. The directories may contain usage statistics on incoming and outgoing communications of computing device 2, contacts lists, contact information, block lists, prioritization data, and so on. Server 14 may maintain a copy of directories stored locally on computing device 2 in data store 16 (e.g., a backup of the directories stored on computing device 2). Server 14 may also be configured to automatically synchronize directories of computing device 2 and corresponding directories of data store 16. In some examples, server 14 may be configured to obtain data, such as contact or biographical information, status, offers, and similar information, on one or more contacts found on a public network and synchronize the gathered data with computing device 2.

Server 14 may be configured to modify the contents of a directory of data store 16 based on the location of potential originators of incoming communications to computing device 2. The location of potential originators of incoming communications may include the geographic location of a potential originator or a social location of the potential originator with respect to a user of computing device 2. Server 14 may receive geographic location information from or about computing device 2. The geographic location may include global positioning system (GPS) coordinates or a triangulated location based on the signals of cellular towers reachable by computing device 2, as non-limiting examples. Responsive to receiving the location information for computing device 2, server 14 may determine relevant local contacts and services based on the location information. For example, server 14 may search one or more databases for potential originators in the physical proximity of computing device 2 (e.g., within a five mile radius of computing device 2) corresponding to historical usage of computing device 2 (e.g., identifying local restaurants or other services and businesses of a type that would likely to contact a user of computing device 2).

Social location may be determined by examining one or more contacts lists or other social networking service directories associated with a user of computing device 2. For example, server 14 may be configured to access a social networking service account of a user of computing device 2 and identify potential originators of incoming communications. After identifying a potential originator of an incoming communication, server 14 may be configured to assign a base priority or relative importance to the identity of the originator and update a directory in data store 16 with the relative importance or base priority and identity of the potential originator. In some examples, additional relevant information, such as a brief description of the originator or additional contact or identification data, may be stored in data store 16 by server 14 as well.

As illustrated in FIG. 1, computing device 2 may include output device 6, transceiver 4, and message prioritization module 10. Transceiver 4 may be an interface configured to transmit data to and receive data from one or more servers 14 or other peripheral devices. Transceiver 4 may support wireless or wired communication, and may include appropriate hardware and software to provide wireless or wired communication. For example, transceiver 4 may include one or more of an antenna, modulators, demodulators, amplifiers, and other circuitry to effectuate communication between computing device 2 and one or more servers 14.

Computing device 2 may use identifying information associated with an incoming communication to determine the originator of the incoming communication and generate a prioritization score for the communication based on the identity of the originator. In one example, computing device 2 may receive an incoming communication. The incoming communication may include identifying information of the originator of the incoming communication, such as an originating address or computing device 2 may receive the identifying information using other communications (e.g., by requesting the identifying information from another device).

During or upon completion of the communication, computing device 2 may gather usage statistics about the communication and update one or more directories located aboard computing device 2 with the usage statistics. Computing device 2 may transmit the usage statistics over network 12 to server 14 to update one or more directories located in data store 16 on server 14. Computing device 2 may also download data, such as details (e.g., biographical information, status updates, offers, products lists/menus, current location, and similar data) or contact information of potential originators, updated prioritization information, and block lists, from server 14 and update the one or more directories located on computing device 2 with the data.

A user may be alerted to, view, or interact with an incoming communication and data downloaded by computing device 2 via output device 6. One or more output devices 6 may also be included in computing device 2. Output device 6, in some examples, is configured to provide output to a user using tactile, audio, or video stimuli. Output device 6, in one example, includes a touch-sensitive screen, sound card, a video graphics adapter card, or any other type of device for converting a signal into an appropriate form understandable to humans or machines. Additional examples of output device 6 include a speaker, a cathode ray tube (CRT) monitor, a liquid crystal display (LCD), e-ink, organic light emitting diode (OLED), or any other type of device that can generate intelligible output to a user. For example, output device 6 may present a web browser, or other functions that may need to be presented to a user, such as graphical user interface (GUI) 18.

User interface 8 may include a touch screen interface, keypad, mouse and keyboard, or similar device. User interface 8 may further include a graphical user interface, e.g., GUI 18, to guide the interaction between a user and computing device 2. User interface 8 may allow a user to interact with and control computing device 2. For example, a user may adjust one or more parameters of message prioritization module 10, accept or reject incoming communications, and read information about the originator of the incoming message through user interface 8.

Message prioritization module 10 may include a hardware or software module configured to generate a priority score for the incoming communication. Message prioritization module 10 may apply one or more sets of hierarchal rules to the identity of the originator of the incoming communication to determine the relative importance of the incoming communication and generate a prioritization score based on the outcomes from the one or more sets of hierarchical rules. Message prioritization module 10 may then cause GUI 18 and computing device 2 to indicate the priority of the incoming communication to a user of computing device 2.

GUI 18 may allow a user to interact with computing device 2 and may display information to the user to assist the user in determining whether to answer the incoming communication. GUI 18 may display the identity of the originator of the incoming communication, e.g., contact field 20, as well as contact information, such as identifier field 22, and a priority score, displayed in priority field 24. The priority score may be displayed to both indicate the relative importance of the incoming communication, as generated by prioritization module 10, and to allow the user to adjust the prioritization score, GUI 18 may also provide means for the user to accept or reject the incoming communication.

The identity of the originator of the incoming communication may be displayed in contact field 20 of GUI 18. Computing device 2 may use identification information, such as a phone number, contained in or accompanying the incoming communication to identify the originator of the incoming communication. Computing device 2 may query a locally stored directory containing potential contacts to determine the identity of the originator of the incoming communication. Additional details regarding the originator, for example the type of originator or rating of the originator if the originator is a business, may also be displayed.

Contact information, such as a phone number or address, may be displayed in phone identifier field 22. GUI 18 may display not only the originating address or phone number of the incoming communication but also additional contact information that may allow a user to more easily contact the originator of the incoming communication at a later time. The additional contact information may be stored locally to computing device 2 in one or more directories.

The prioritization score generated by message prioritization module 10 may be displayed in priority field 24. The prioritization score may indicate to a user how important the incoming communication is. The prioritization score may also factor into an alert generated by computing device 2. For example, if the incoming communication is assigned a high priority, computing device 2 may generate a loud or strident alert to signal to a user that the message is of high importance. Less important messages may be coupled with less intrusive alert signals or alternate types of alert signals to indicate to the user the identity of the originator, a classification of the originator (e.g., business, family, or friend), or the decreased importance of the message. The user may be able to configure the rule sets applied by message prioritization module 10 to customize the prioritization process and adjust the generated prioritization scores.

A user may accept the incoming communication by touching or actuating accept button 26 of GUI 18. Computing device 2 may monitor a variety of usage characteristics associated with the incoming communication and use these characteristics to update a directory local to computing device 2. These usage characteristics may be used in a set of hierarchical rules to determine the relative importance of future communications originating from the contact or related entities. For example, a brief communication may indicate that the originator is a an unwelcome telemarketer or other solicitor while a long duration exchange between the user and originator may indicate that the user has a business or social connection with the originator and greater importance may be attached to communications from this contact.

A user may reject or ignore the incoming communication by touching or actuating ignore button 28 of GUI 18. Computing device 2 may forward the incoming communication to voice mail or otherwise dispose of the incoming communication. Computing device 2 may also collect bounce rate statistics for the originator of the ignored communication. Bounce rate statistics indicate how frequently the messages from a particular originator are ignored and may reflect on the importance of messages from the originator. In some examples, server 14 may aggregate bounce rate statistics from users of multiple computing devices 2, updating a directory located in data store 16 on server 14 as well as computing device 2 with data regarding potential originators with high bounce rates.

In some examples, techniques of the present disclosure provide privacy and/or security functionality for any data collected or processed by computing device 2 and/or servers 14. For instance, users may opt out of some or all functionality described in the present disclosure. In this way, users can choose whether techniques of the present disclosure are applied to incoming communications.

Figure 2:
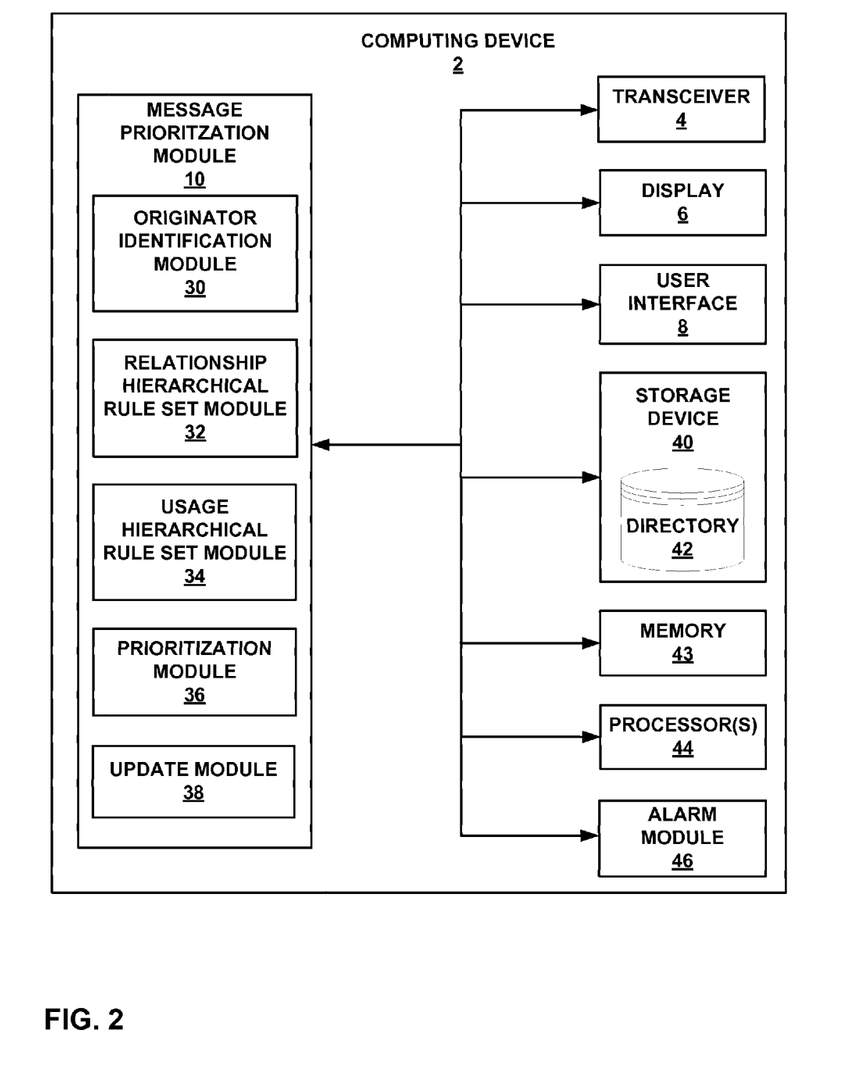
FIG. 2 is a block diagram illustrating an example computing device that prioritizes incoming communications.

FIG. 2 is a block diagram illustrating example computing device 2 that prioritizes incoming communications. FIG. 2 illustrates only one particular example of computing device 2, and many other example embodiments of computing device 2 may be used in other instances. For example, computing device 2 may include additional components and run multiple different applications.

As illustrated in FIG. 2, computing device 2 includes transceiver 4, output device 6, user interface 8, message prioritization module 10, storage device 40, and processor 44. Message prioritization module 10 may include originator identification module 30, relationship hierarchical rules set module 32, usage hierarchical rule set module 34, prioritization module 36, update module 38, and alarm module 46. Each of components 4, 6, 8, 10, 40, and 44 may be interconnected (physically, communicatively, and/or operatively) for inter-component communications.

Although shown as separate components in FIG. 2, in some examples, one or more of modules 10, 30, 32, 34, 36, 38, and 46 may be part of the same module. In some examples, one or more of modules 10, 30, 32, 34, 36, 38 and 46, and one or more processors 44 may be formed in a common hardware unit. In certain examples, one or more of modules 10, 30, 32, 34, 36, 38, and 46 may be software and/or firmware units that are executed on or operable by one or more processors 44.

One or more processors 44 may include, in certain examples, any one or more of a microprocessor, a controller, a digital signal processor (DSP), an application specific integrated circuit (ASIC), a field-programmable gate array (FPGA), or equivalent discrete or integrated logic circuitry. In some examples, storage device 40 may store one or more instructions that cause one or more processors 44 and modules 10, 30, 32, 34, 36, 38, and 46 to perform various functions ascribed to one or more processors 44, and modules 10, 30, 32, 34, 36, and 38, and 46. Processors 44, in one example, are configured to implement functionality and/or process instructions for execution within computing device 2. For example, processors 44 may be capable of processing instructions stored in memory 43 or instructions stored on storage device 40. These instructions may define or otherwise control the operation of operating message prioritization module 10.

Memory 43, in one example, is configured to store information within computing device 2 during operation. Memory 43, in some examples, is described as a computer-readable storage medium. In some examples, memory 43 is a temporary memory, meaning that a primary purpose of memory 43 is not long-term storage. Memory 43, in some examples, is described as a volatile memory, meaning that memory 43 does not maintain stored contents when the computer is turned off. Examples of volatile memories include random access memories (RAM), dynamic random access memories (DRAM), static random access memories (SRAM), and other forms of volatile memories known in the art. In some examples, memory 43 is used to store program instructions for execution by processors 44. Memory 43, in one example, is used by software or applications running on computing device 2 (e.g., message prioritization module 10) to temporarily store information during program execution.

Storage device 40 may include any form of machine- or computer-readable media. For example, storage device 40 may include any volatile, non-volatile, magnetic, optical, or electrical media, such as a hard drive, random access memory (RAM), read-only memory (ROM), non-volatile RAM (NVRAM), electrically-erasable programmable ROM (EEPROM), flash memory, or any other digital media. The contents of storage device 40 may be updated through instructions received via transceiver 4 or via user interface 8.

Storage device 40 may, in some examples, be considered as a non-transitory storage medium. The term "non-transitory" may indicate that the storage medium is not embodied in a carrier wave or a propagated signal. However, the term "non-transitory" should not be interpreted to mean that the storage device 40 is non-movable. As one example, storage device 40 may be removed from computing device 2, and moved to another device. As another example, a storage device, substantially similar to storage device 40, may be inserted into computing device 2. In certain examples, a non-transitory storage medium may store data that can, over time, change (e.g., in RAM).

Storage device 40 may include directory 42. Directory 42 may contain data on potential originators of communications to the user of computing device 2. Directory 42 may be accessible by message prioritization module 10. The contents of directory 42 may be updated or synchronized with the contents of data store 16 of server 14, allowing data on potential contacts by server 14 to be stored locally on computing device 2. Usage history data may also be included in directory 42 and may be transmitted to server 14 and data store 16 using transceiver 4, for example. Directory 42 may contain one or more databases, tables, or other data structures configured to store one or more contacts of a user of computing device 2, as well as databases of past originators of incoming communications and potential originators of incoming communications. A past originator of an incoming telephonic message is an entity, person, or business associated with an incoming communication previously sent to the user. A potential originator of an incoming telephonic message is an entity, person, or business that may originate an incoming message to the user in the future. Inclusion in a database of potential originators may be based on a probability that a potential originator will send an incoming message to the user. The probability may be determined based on, for example, physical proximity, use by the user of similar services, social contacts with the user, and other factors.

Computing device 2, in some examples, also includes transceiver 4. Transceiver 4 may allow computing device 2 to communicate on one or more networks. Transceiver 4 may include an antennae and wireless transceiver for communicating on a wired or wireless network and may include Bluetooth®, 3G and WiFi® radios, or may be a network interface card, such as an Ethernet card, an optical transceiver, a radio frequency transceiver, or any other type of device that can send and receive information.

User interface 8 may allow a user of computing device 2 to interact with computing device 2. Examples of user interface 8 may include, but are not limited to, a keypad embedded on the computing device 2, a keyboard, a mouse, a roller ball, buttons, a touch screen, or other devices that allow a user to interact with computing device 2. In some examples, output device 6 may present some or all of the functionality of user interface 8. For instance, output device 6 may be a touch screen that can allow a user to interact with computing device 2 via user interface 8 and GUI 18.

Computing device 2 may be configured to receive an incoming communication using transceiver 4, generate a priority score for the communication using message prioritization module 10, and alert a user of computing device 2 to the presence of the incoming communication using alarm module 46 (via, e.g., output device 6) based on the prioritization score determined by message prioritization module 10. In some examples, computing device 2 may generate alternative alerts based on the type of incoming message, identity or type of originator, and the priority. Computing device 2 may, for some prioritization scores, not generate an audio or visual alert signal and instead simply make a record of the incoming communication for later review by the user.

Message prioritization module 10 is configured to determine the relative importance of an incoming communication. In some examples, message prioritization module 10 may apply two sets of hierarchical rules to the identity of the originator of the incoming communication. The message prioritization module 10 may then generate a prioritization score based on the outcomes of the two rules sets. Other configurations of message prioritization module 10 may use a different number of hierarchical rules sets or combine the functions of one or more rule sets together into a single module.

Alarm module 46 may provide an alarm or indication to a user of computing device 2 (e.g., using output device 6) that an incoming communication has been received. Alarm module 46 may provide a different alert depending on who the originator is or the type of entity or category the originator of the incoming communication falls into and the priority of the incoming communication, as determined by message prioritization module 10. For example, alarm module 46 may cause output device 6 to provide an audio alert, e.g., a ring tone or other sound to indicate an incoming communication. Alarm module 46 may also cause output device 6 to provide a tactile alarm, e.g., a vibration, or visual alert via one or more lights built into computing device 2 or through output device 6. Alarm module 46 may be actuated by processor 44 or, in some examples, by message prioritization module 10. In some examples, alarm module 46 may cause output device 6 to supersede a user selected "silent" or "vibrate" mode and provide an audible alert given a high priority of the incoming communication. That is, in examples where computing device 2 is configured to not provide an audible alert upon receiving incoming communications, techniques of this disclosure may enable the configuration settings to be superseded or overridden such that incoming communications of a sufficiently high priority (e.g., higher than a threshold priority level) may cause computing device 2 to output an audible alert using output device 6.

Originator identification module 30 may determine the identity of the originator of the incoming communication using identification information, such a phone number, IP address, or other identifiers appropriate to the type of communication. Originator identification module 30 may obtain the identification information from the incoming communication or may receive the information separately from the message. The originator identification module may consult one or more databases contained in directory 42 of storage device 40 to match the identification information with a known identity of an originator. Alternatively, or if the identification information does not correspond to an entry in directory 42, originator identification module 30 may consult a database contained on server 14 or may transmit a query containing the identification information to an Internet based repository of identification information, and receives the identity of the originator of the incoming communication.

Relationship hierarchical rule set module (RHRSM) 32 may apply a set of hierarchical rules to the incoming message to determine the relationship between the user of computing device 2 and the originator of the incoming communication and assign a relative importance to the incoming communication based on this relationship. Part of this relationship may factor in the social connections between the user and the originator of the incoming communication. Factors that may be considered include presence on a contact list of the user, presence on a social network of the user, presence on a block list, and others.

The user may indicate that there is a connection between the user and originator by including the originator of the incoming communication in a contacts list stored in, for example, directory 42. The inclusion, in various instances, indicates that the user expects to contact, or be contacted by, the originator in the future. Therefore, the inclusion in a user's contact list is indicative of the increased importance of the incoming message relative to those of originators who are not included in the contact list. Presence on a social networking account also indicates a connection between the user and the originator, though perhaps to a lesser degree than the presence on a contact list might. A block list, whether maintained by the user or by a third party, for example a list compiled from multiple users targeting robocalls and similar nuisances, indicates a low importance. Further, RHRSM 32 may also factor in the type of originator, e.g., is the potential originator a family member, a friend, acquaintance, coworker, customer, business relevant to the user, and so on. Each category of potential originator may be associated with a different priority level, and this priority level may change depending on the time of day or day of the week. For example, a coworker's call may be very important during working hours to a user, but very unimportant once the user is no longer at work.

Usage hierarchical rule set module (UHRSM) 34 may apply a set of hierarchical rules to the incoming message to determine the relative importance of the incoming communication based on the usage history of the user of computing device 2. The usage history of the user of computing device 2 may include the interactions between the user of computing device 2 and contacts similar to the originator of the incoming communication as well as the interactions between the user and the originator. In some examples, usage history may be compiled across multiple users and multiple computing devices 2 compiled by, for example, server 14 and/or stored locally to computing device 2 in storage device 40 (e.g., in directory 42).

Usage history may include call frequency, call duration, recent call history to the originator or related contacts, bounce rate, and similar statistics. For example, if the usage history shows that the user has placed multiple communications with the originator of the incoming communication, the usage history indicates that the user of computing device 2 may place relatively high importance on the incoming message or that the message was likely solicited by the user. Long duration messages between the user and the originator may indicate that there is substantial contact between the originator and the user, potentially raising the importance of the incoming communication. A high bounce rate may indicate that the incoming communication is likely unimportant.

Prioritization module 36 may be configured to evaluate the outputs of RHRSM 32 and UHRSM 34 to generate a prioritization score based on the relative importance determined by RHRSM 32 and UHRSM 34. The prioritization score, in one example, is configured such that a higher prioritization score corresponds to a higher importance incoming communication. In some examples, the prioritization score for each incoming communication may be limited to a predefined range or specific prioritization score based on the type of the caller associated with incoming communication. As one example, the prioritization score generated for any call originating from a phone number associated with work may be limited to a value between one and three, or maybe assigned a single prioritization score, such as two. As another example, the prioritization score generated for any call originating from a family member may be limited to a value between three and five or may be assigned a single prioritization score, such as four. In various instances, the prioritization score generated by prioritization module 36 for each incoming communication may be determined based on the frequency of incoming communications originating from the same caller within a predetermined amount of time (e.g., if a co-worker calls three times within ten minutes, prioritization module 36 generates a higher prioritization score for the third incoming communication than the first incoming communication). The prioritization score may be displayed on output device 6 via GUI 18.

Message prioritization module 10 may determine an appropriate response to an incoming communication. For example, given a low prioritization score, computing device 2 may be configured to not alert the user of computing device 2 immediately. In such a situation, computing device 2 may be configured to notify the user of the incoming communication on the next occasion that the user interacts with computing device 2. The prioritization score may also be used to determine the type of alert generated by alarm module 46.

Update module 38 may update directory 42 in storage device 40 with usage statistics of the incoming communication. Update module 38 may also activate, or cause processor 44 to activate, transceiver 4 to transmit usage information to server 14 and data store 16 via network 12. Update module 38 may also receive updated information regarding potential originators, block lists, bounce rate data, and similar statistics from data store 16 and storage device 14 over network 12 and cause directory 42 locally located in storage device 40 to store the received data.

Figure 3:
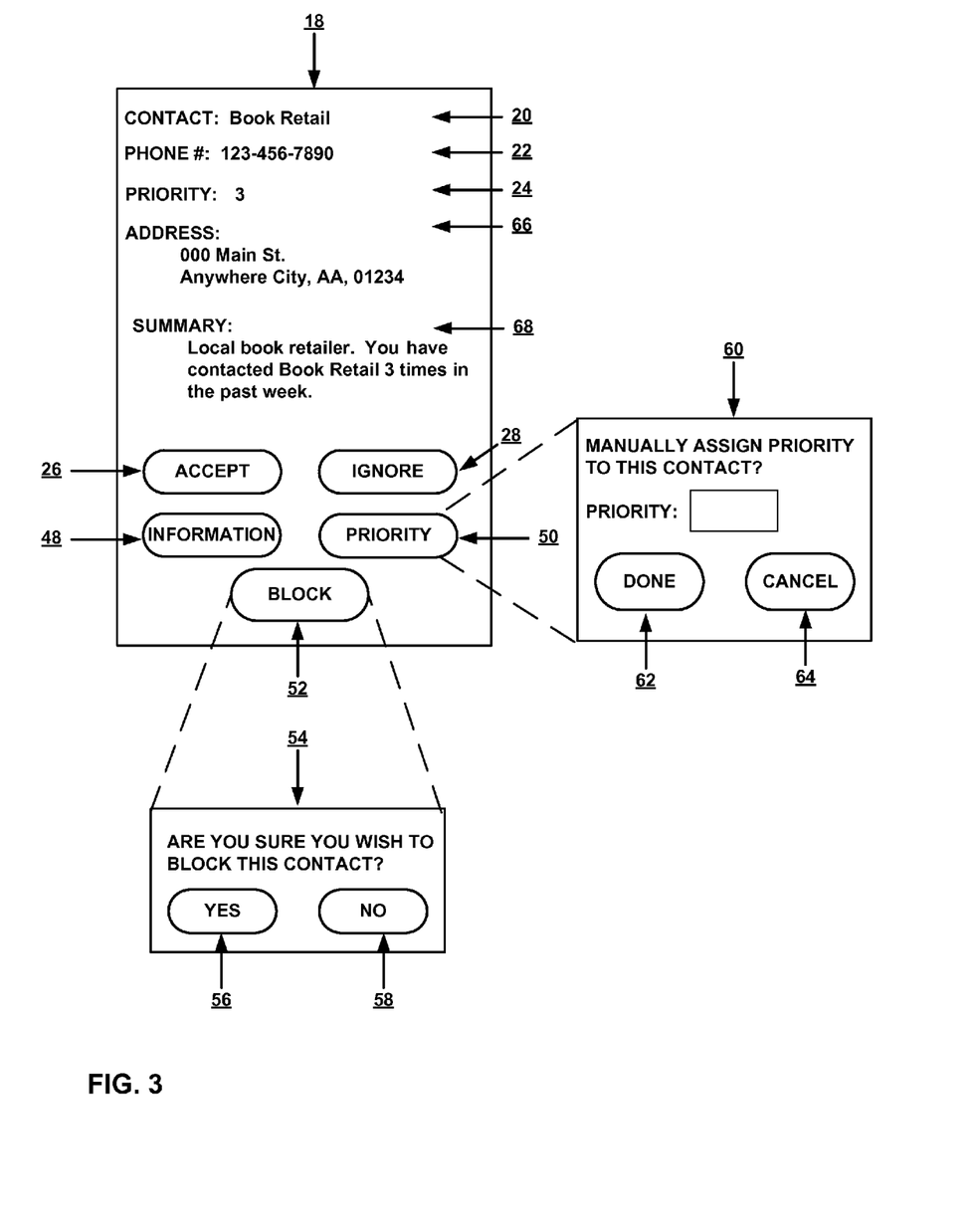
FIG. 3 is a diagram illustrating an example graphical user interface (GUI) that displays incoming communication information.

FIG. 3 is a diagram illustrating an example graphical user interface (GUI) 18 that displays incoming communication information. GUI 18 may be generated by message prioritization module 10 executing on computing device 2 of FIG. 1. GUI 18 may enable a user to interact with computing device 2 and message prioritization module 10. In some examples, GUI 18 may also enable a user of computing device 2 to customize one or more parameters evaluated by RHRSM 32 or UHRSM 34.

As shown in FIG. 3, GUI 18 includes contact field 20, identifier field 22, and priority field 24. Information, such as identity of the originator, originating address (e.g., telephone number), and prioritization score, about the incoming communication may be displayed in contact field 20, identifier field 22, and priority field 24. Contact field 20 may display the name or identity of the originator of the incoming communication. Identifier field 22 may display information used to identify the originator of the incoming communication, e.g., the originating telephone number received along with the incoming communication. In other examples, identifier field 22 may display relevant identification information, such as an IP address in the case of a VoIP communication. Priority field 24 may display the prioritization score generated by message prioritization module 10. This may be part of an alert generated by alarm module 46 (e.g., via output device 6) as well as serving as indication to the user of computing device 2 of the relative importance of the incoming communication and assist the user in determining whether to answer the incoming communication.

Additional contact information of the originator of the incoming communication may be displayed in address field 66. For example, this additional contact information may include a physical or mailing address or alternative contact phone numbers. This additional information may be stored locally to computing device 2 in storage device 40, for example in a database located in directory 42 of storage device 40. Update module 38 of message prioritization module 10 may update the additional contact information based on information gathered by server 14 over network 12.

Information summarizing the originator of the incoming communication or justifying the prioritization score or otherwise providing a basis for the prioritization score may be displayed in summary field 68. For example, if the originator of the incoming communication is a business, a brief description of the type of business and business ratings or reviews may be displayed in summary field 68. Alternatively or in addition, summary field 68 may display information gathered from a social networking site, e.g., a status update, photograph, or similar materials, accessed via transceiver 4. The displayed information may also be stored locally to computing device 2. Computing device 2 may display data relevant to the prioritization score in summary field 68. For example, computing device 2, in summary field 68, may display the number of times the user of computing device 2 has contacted the originator of the incoming communication. In other embodiments, computing device 2, in summary field 68, may display information relating to block lists, bounce rates, call frequency, and so on.

Accept button 26 and ignore button 28 may enable the user of computing device to accept or ignore the incoming communication. Upon activation of either button, computing device 2 may collect usage statistics, such as call duration and bounce rate, and store the usage statistics in a database located in directory 42 of storage device 40.

Information button 48 may enable GUI 18 to display a second window showing more detailed information about the originator of the incoming communication. The detailed information may be gathered by a server, e.g., server 14, from the Internet or stored locally on computing device 2. Additional information displayed may include a detailed business description, alternative contacts, business reviews, and other similar information. If the originator of the incoming communication is a private individual, additional information may include additional contact information, biographical information, status updates or news feeds from one or more social networks, mutual connections, and so on.

Priority button 50 may enable a user to access a second GUI, prioritization graphical user interface (PGUI) 60, that may enable the user to manually adjust the prioritization score of the originator of the incoming communication. PGUI 60 may allow the user to manually enter the desired prioritization score for the originator, overriding the relative importance generated by RHRSM 32 and UHRSM 34. The manually entered priorities may be stored in a database in directory 42 of storage device 40. Activating done button 62 may cause computing device 2 to save the manually entered priority. Cancel button 64 may cause PGUI 60 and computing device 2 to abandon the attempt to manually enter the prioritization score. In some examples, the manually entered prioritization score may be valid for a limited duration. For example, if a user is having his/her kitchen remodeled for the next four weeks, the user may manually assign a high prioritization score to any incoming communication originating from the contractor remodeling the kitchen during the time in which the kitchen is being remodeled (e.g., within a time limit of four weeks). Once the time limit expires (i.e., when the remodeling is complete), incoming communications from the contractor go back to being dynamically assigned a prioritization score using the techniques described herein.

Block button 52 may cause GUI 18 to display a second window, block graphical user interface (BGUI) 54, which may enable the user of computer device 2 to block or otherwise permanently or semi-permanently ignore the incoming communications of the originator. By actuating yes button 56, the user may cause computing device 2 to record the originator of the incoming communication on one or more lists stored in directory 42 of storage device 40 that message prioritization module 10 (e.g., prioritization module 36 of message prioritization module 10) may use to block or otherwise reduce the prioritization score of the incoming message. Actuating no button 58 may cause computing device 2 to abandon the effort to block the originator and return the user to GUI 18. The block or other list may be updated or synched to a database maintained on data storage device 16 on server 14 via network 12.

Figure 4:
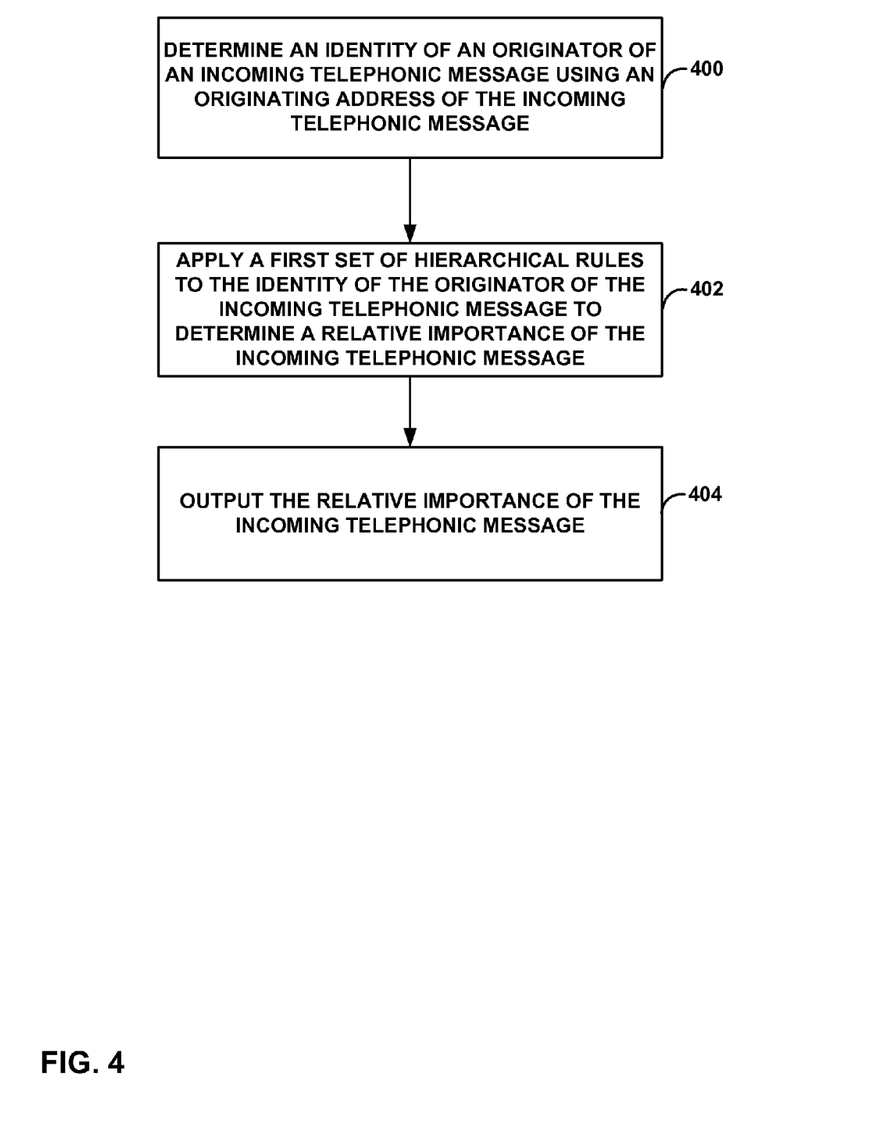
FIG. 4 is a flowchart illustrating an example process for prioritizing an incoming communication.

FIG. 4 is a flowchart illustrating an example process for prioritizing an incoming communication. For purposes of illustration only, the example process is described below within the context of system 1 of FIG. 1 and computing device 2 of FIG. 2. However, the example process of FIG. 4 may be performed using other devices.

Determining an identity of an originator of an incoming communication using an originating address of the incoming communication (400) may include utilizing a module, such as originator identification module 30 of message prioritization module 10. Computing device 2 may receive an incoming message including identification information of the originator of the incoming communication (e.g., the originating address). In some examples, the identification information may be included in a separate communication received by computing device 2. Determining the identity of the originator may include comparing the identification information to entries in a database containing linked identification information and contacts stored locally on computing device 2, for example in directory 42 of storage device 40. In some examples, computing device 2 may receive the identity of the originator of the incoming communication from an external source, such as server 14, via network 12. Computing device 2 may transmit the identification information to server 14 to enable server 14 to make the identification or server 14 may independently retrieve the identification information from the incoming communication.

Applying a first set of hierarchical rules to the identity of the originator of the incoming communication to determine a relative importance of the incoming communication (402) may include applying one or more rules based on the location of the originator to the user of computing device 2. Applying a set of hierarchical rules may include applying a series of rules which successively narrows the range of possible relative importance. For example, an initial rule may evaluate whether the originator of the incoming communication is classified as an important or emergency contact and automatically grant the highest importance to the originator of the incoming communication. That is, in various instances, if a contact is classified as an important contact, the relative importance assigned to the incoming message from the application of the set of hierarchical rules may be overridden and, instead, the incoming message may be assigned a highest level of relative importance. Classification as an important or emergency contact may also result in the incoming communication being marked for special processing, such as unique alerts, removal from further priority processing, and exemption from user selected modes and rules (e.g., bypassing "silent" mode and immediately sounding an audible alert). Important contacts may include services related to the health, security, or safety of the user of the computing device. For example, emergency response personnel may be classified as an important contact and may automatically be given the highest importance rating.

RHRSM 32 may apply a follow-up rule determining whether the originator of the incoming communication is a business entity or private person, each having a different possible relative importance range. These classifications may be further sub-divided, allowing the originator of the incoming communication to be sorted into a category that assigns an importance to the incoming communication. RHRSM 32 may further, for example, determine whether the originator is family member, if the originator is a private person, and further narrow the relative importance range. RHRSM 32 may then sort the family member originator into a tertiary category, such as immediate family, close cousins, or distant relatives. For originators classified as a business, a sub-category hierarchy might include determining if the originator is a restaurant, if the restaurant is nearby, and if the restaurant delivers. Each rule or classification in the hierarchy may be successively applied until a relative importance is reached. The rules managing the hierarchy and classification, and the importance of each rule or classification, may be predefined or user managed.

Alternative configurations may include causing RHRSM 32 or a similar module to apply a series of rules designed to increase or decrease the importance of the incoming message. For example, RHRSM 32 may make an initial determination about whether the originator is a business or private party, and generate a base relative importance. If the originator is a private party and also a family member of the user, the relative importance may be increased above the base probability. An unknown private party may reduce the base probability, and so on.

RHRSM 32 may use the first set of hierarchical rules to determine the relative importance of the incoming communication based on information about the originator of the incoming communication included in a directory (e.g., directory 42, of computing device 2). The directory includes information about potential originators of incoming communications based on a location of the potential originators. The location of the potential originators may refer either to the physical location of the originator or the social location with respect to the user. The physical location may be based off of the geographic location of computing device 2. Computing device 2 may be loaded or updated to contain the profiles of local businesses the user may be likely to be contacted by. For example, a user who frequently orders pizza delivery may have data on one or more local pizza restaurants stored on computing device 2. In various instances, RHRSM 32 may assign a higher relative importance to communications originating from one of the service providers because the user frequently contacts these services. Contact information for a non-local pizza restaurant would be likely irrelevant to the user as the user would be unable to make use of the services the foreign restaurant offers. Computing device 2 may similarly maintain data of other relevant local business, people, and services that might contact the user of computing device 2 in a local directory, e.g., directory 42.

Social location may be based off of one or more social links between the user and potential originators accessible to computing device 2. For example, social networking accounts provide a database of potential originators who may contact the user of computing device 2. Computing device 2 may be able to access the information contained in these accounts via a data mining routine or some other algorithm employed by server 14 or directly by computing device 2. Gradations may be made between the social contacts of the user through various metrics. For example, an entity on a social network who shares many mutual 'friends' or contacts with the user of computing device 2 is likely much closer socially to the user than an entity with no mutual connections with the user. Accordingly a higher importance may be placed on incoming communications originating from the closer entity. Also, databases containing reviews or opinions may be useful in determining the importance of an originator. A user may be more interested in receiving calls from an entity that is well regarded generally or is frequented by the social contacts of the user. Conversely, past interactions of various users with a particular originator may indicate that the originator of the incoming communication is engaged in solicitation, poll taking, or some other behavior that a user may find of low importance. By aggregating these experiences, either across all users or across the social network of a user, a block list or similar indication of low priority may be derived.

Outputting, by computing device 2, the relative importance of the incoming communication (404) may include alerting the user of computing device 2 to the presence of the incoming communication, for example via alarm module 46 and output device 6. Outputting the relative importance of the incoming communication may also include indicating the relative importance to the user, e.g., via GUI 18 of output device 6 or an alert signal selected by alarm module 56 and generated by output device 6. Alarm module 46 may select different alert signals based on the relative importance and type of originator. Further, the alert selected by alarm module 46 may be user customizable. For example, the user may specify one or more songs, sounds, or vibration patterns to indicate particular contacts or classes of contacts. Computing device 2 or message priority module 10 may be shipped or downloaded configured with a predefined set of alerts prepared or available for use. Alarm module 46 may be configured to accept user input limiting the available types of alters Alarm module 46 may cause output device 6 to provide (e.g., limiting output device 6 to tactile or visual alerts in a "silent" mode). In some examples, alarm module 46 may supersede these limitations given a high priority score or an important or emergency contact classification.

Figure 5:
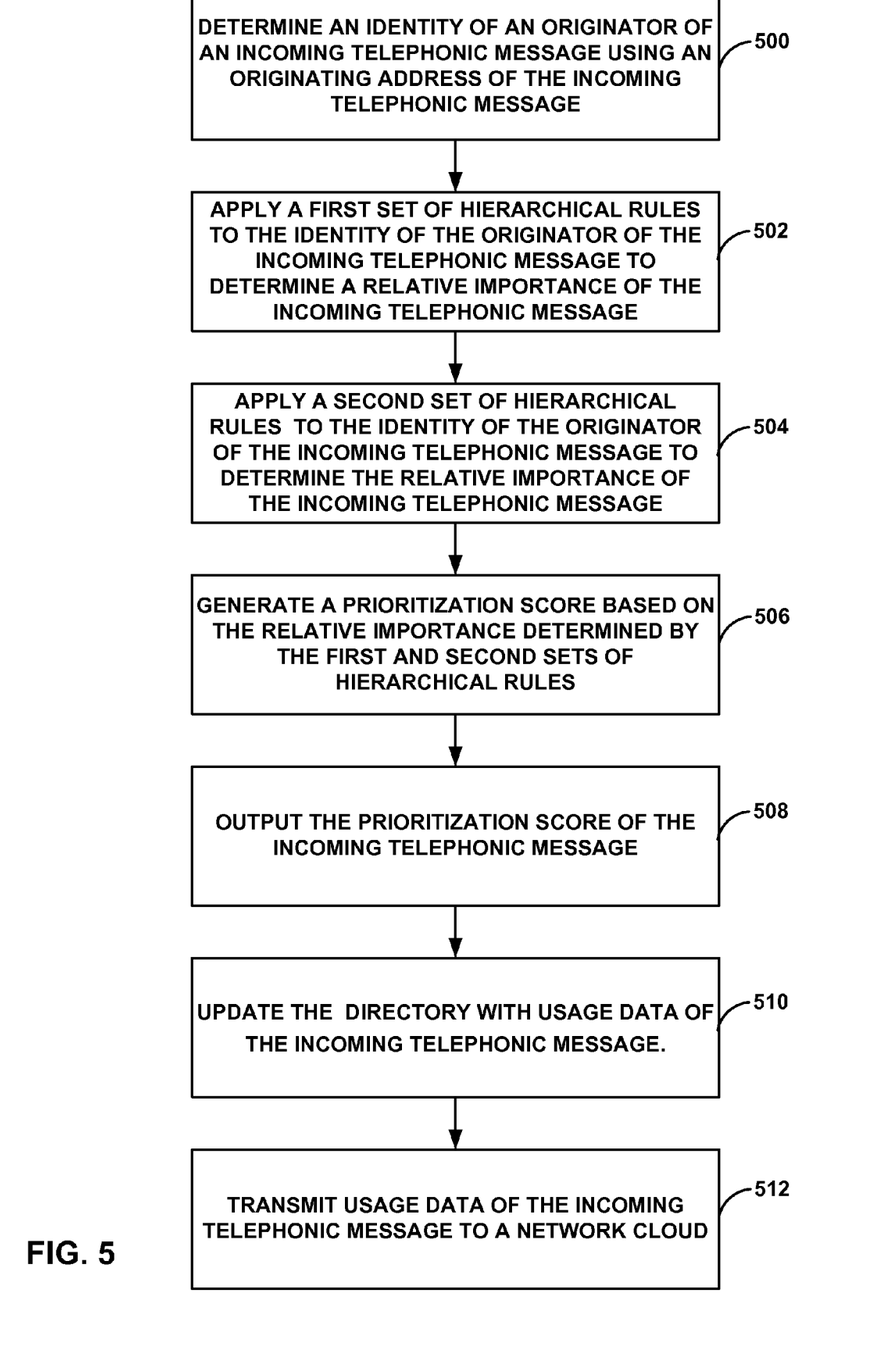
FIG. 5 is a flow chart illustrating an alternative example process for prioritizing an incoming communication.

FIG. 5 is a flow chart illustrating an alternative example process for prioritizing an incoming communication. For purposes of illustration only, the example process is described below within the context of system 1 of FIG. 1 and computing device 2 of FIG. 2. However, the example process of FIG. 5 may be performed using other devices.

Originator identification module 30 of message prioritization module 10 may determine an identity of an originator of an incoming communication using an originating address of the incoming communication (500). Computing device 2 may receive an incoming message including identification information of the originator of the incoming communication (e.g., the originating address). In some examples, the identification information may be included in a separate communication received by computing device 2. Determining the identity of the originator may include comparing the identification information to entries in a database containing linked identification information and contacts stored locally on computing device 2, for example in directory 42 of storage device 40. In some examples, identification may be performed externally to computing device 2, e.g., via server 14 over network 12. The originating address of the incoming communication may include a phone number, IP address, or similar designator of origin. The originating address may include a component of the incoming communication or may accompany the incoming communication.

Applying a first set of hierarchical rules to the identity of the originator of the incoming communication to determine a relative importance of the incoming communication (502) may include applying a set of hierarchical rules based on the physical or social location of the originator of the incoming communication with respect to the user of computing device 2. RHRSM 32 of message prioritization module 10 may apply these rules. A user of computing device 2 may customize the application of these rules. In some examples, a portion of GUI 18 may allow in-depth customization of the rule set, whether through direct adjustment of priority, such as through PGUI 60, or through altering the characteristics of the rules and the factors that the rule set may consider. This may be accomplished directly through computing device 2 or when computing device 2 is linked with some other device, e.g., if computing device 2 links with a home computer to synchronize. Further, a module of computing device 2, e.g., message prioritization module 10, may combine these hierarchical rules with other rule sets to create a combined rule set applied to the originator of the incoming communication. For example, the location and identity based rule of RHRSM 32 may be combined with the usage based rule set of UHRSM 34, creating a single module generating one or more prioritization scores.

UHRSM 34 may apply a second set of hierarchical rules to the identity of the originator of the incoming communication to determine the relative importance of the incoming communication (504) based on previous interactions between the user of computing device 2 and the originator of the incoming communication. Previous interactions between the user and the originator of the incoming communication may include usage statistics such as incoming or outgoing call frequency, call duration, and bounce rate. Frequent incoming communications from the originator to the user may indicate that the originator has important information to deliver or may indicate a regular course of business between the user and the originator, increasing the relative importance of the incoming message. Outgoing calls from the user to the originator prior to the incoming communication may indicate that the user solicited the incoming communication or that the incoming communication may be relevant to a prior or ongoing course of business or exchange between the user and the originator, also raising the likely importance of the incoming communication. Lengthy call duration may indicate that prior exchanges between the user and the originator were of some importance, increasing the likelihood that the current incoming communication is also important, while past short call duration indicates that the originator is unlikely to send a message the user of computing device 2 regards as important. Bounce rate indicates an originator that a user regards as of low importance, and so the current incoming message is likely of low importance.

Some of these factors may be time dependent. For example, call frequency may be only relevant in the short term. In some situations, a course of business or a relationship may be concluded and upon conclusion a user may place very low importance on any further message from the originator. In such situations, a time threshold feature may prevent message prioritization module 10 from skewing the determination of relative importance of an incoming communication based on out of date data. In some examples, usage data may include the interactions between the originator of the incoming communication and other users. Collecting usage data from multiple users may enhance the determination of importance with respect to some originators, especially bulk originators such as telemarketers and other nuisances. Numerous users generating similar short duration usage statistics, e.g., multiple users hanging up on the same phone number, may indicate that the originator of these communications is very undesirable or unimportant and computing device 2 may assign a low importance to these communications before the user is disturbed by them.

UHRSM 34 of computing device 2 may evaluate these factors may sequentially, e.g., evaluating each of these factors in turn, to arrive at a composite relative importance. Each factor may contribute to or detract from a cumulative relative importance. In other configurations, UHRSM 34 may generate a representative metric, such as a mean or median, of the importance of the incoming communication indicated by each factor.

Prioritization module 36 of message prioritization module 10 may generate a prioritization score based on the relative importance determined by the first and second sets of hierarchical rules (506). Prioritization module 36 may generate a statistic representative of the combined relative importance outputted by the two hierarchical rules sets, for example a sum or mean of the relative importance. In some examples, prioritization module 36 may weight one outputted relative importance more heavily than the other. The weighting of the generated relative importance may be user adjustable. Alternatively, prioritization module 36 may coordinate the application of the sets of hierarchical rules by RHRSM 32 and UHRSM 34, allowing one rule set to output a relative importance into the other rule set as an additional variable. The resulting prioritization score may be the net estimated importance of the incoming communication and alarm module 46 of computing device 2 may configure an alert to the user of computing device 2 of the incoming communication based on the resulting prioritization score.

Update module 38 may update directory 42 with usage data of the incoming communication (508). Usage statistics, such as call duration, frequency, and bounce rate, may be stored within one or more databases associated with the identity of the originator of the incoming communication in directory 42 of storage device 40. This data may be locally accessible by computing device 2 and message prioritization module 10. In some examples, update module 38 may access usage statistics stored online, e.g., in data store 16 of server 14. Online usage statistics may include one or more lists, such as a block list, compiled from usage statistics drawn from multiple users or compiled from lists or databases of known telemarketers, solicitors, and other undesirable entities.

Alarm module 46 may indicate the prioritization score of the incoming communication (510), through, for example, an alert generated by output device 6. Indicating the prioritization score may include varying one or more audible alerts. This may include changing the alert type, such as changing the sound file selected by alarm module 46 of computing device 2 to signal the incoming communication, as well as varying the volume or frequency of the alert. Alarm module 46 may also cause output device 6 to indicate the prioritization score tactily, for example through a vibration alert, or visually through patterns of flashing lights or through a number or other indicator shown on output device 6, e.g., on GUI 18.

Update module 38, through transceiver 4, may transmit usage data of the incoming communication to server 14 using network 12 (512). Server 14 may access the usage data over network 12, enabling server 14 to back up the contents of computing device 2 over network 12. In some examples, server 14 may compile usage data from multiple users and computing devices 2 to determine potential originators of incoming communications who may be broadly undesirable to multiple users of computing devices 2. An originator who routinely experiences short call durations and high bounce rates from multiple users is likely undesirable to most users and may be included in a list that may be redistributed to users of computing devices 2 over network 12, allowing a computing device 2 to screen or otherwise prioritize a previously unknown originator.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects have been described in this disclosure. These and other aspects are within the scope of the following claims.

What is claimed is:

1. A method performed by a computing device having at least one processor, the method comprising:
    determining, by the computing device, based at least in part on an originating address of an incoming communication, an identity of an originator of the incoming communication;
    applying, by the computing device, a first set of rules to the identity of the originator of the incoming communication to determine a first importance of the incoming communication, wherein the first set of rules comprise rules generated based at least in part on information about the originator of the incoming communication included in a directory of the computing device, and wherein the directory includes location information about potential originators of incoming communications, and wherein the first importance of the incoming communication is based on a respective location of each of the potential originators and one or more of a geographic location of the computing device or a social location of a user of the computing device;

applying, by the computing device, a second set of rules to the identity of the originator of the incoming communication to determine a second importance of the incoming communication, wherein the second set of rules comprise rules generated based at least in part on previous interactions between the computing device and the originator of the incoming communication, wherein the previous interactions between the computing device and the originator of the incoming communication comprise a frequency of interaction between the originator of the incoming communication and the user of the computing device;

generating, by the computing device, a prioritization score based at least in part on the first importance of the incoming communication and the second importance of the incoming communication; and selectively outputting, by the computing device, based at least in part on the prioritization score, an indication of the incoming communication.

2. The method of claim 1, further comprising:
receiving, by the computing device, a user-specified prioritization score for the incoming communication; and
overriding the generated prioritization score with the user-specified prioritization score.

3. The method of claim 2, wherein the user-specified prioritization score is valid for a limited amount of time, the method further comprising:
responsive to determining that the limited amount of time elapsed, discarding the user-specified prioritization score.

4. The method of claim 1, wherein the previous interactions between the computing device and the originator of the incoming communication comprise sending at least one communication to the originator within a predefined period before the incoming communication was received by the computing device.

5. The method of claim 1, wherein the second set of rules are generated based at least on the duration of the previous communications between the computing device and the originator.

6. The method of claim 1, wherein applying a first set of rules to determine the first importance of the incoming communication comprises:
applying an importance assigned to a contact associated with the originating address of the incoming communication.

7. The method of claim 6, wherein the importance assigned to the contact is predetermined based on a classification associated with the contact and a relationship associated with the contact and the user, and wherein a relative importance associated with the classification and relationship is adjustable by the user of the computing device.

8. The method of claim 6,
wherein applying the importance assigned to the contact comprises applying a highest relative importance when the incoming communication comprises an incoming communication from an originator who provides services related to the health, security, or safety of the user of the computing device, the method further comprising:
outputting, by the computing device, an audible alert.

9. The method of claim 1, wherein the directory includes one or more block lists, wherein the block list comprises a list of contacts or originating addresses to be excluded from communicating with computing device.

10. The method of claim 9, further comprising:
updating at least one of the one or more block lists to include an undesirable entities based on interactions between the undesirable contact and other recipients of communications, wherein a statistic representative of the interactions between the undesirable contact and other recipients of communications is gathered remotely from the computing device and transmitted to the computing device from a server.

11. The method of claim 10, wherein interactions between the undesirable contact and other users comprise a bounce rate on incoming communications originating from the undesirable contact to other recipients of communications, wherein the bounce rate comprises a frequency at which communications originating from the undesirable contact are ignored by the other recipients.

12. The method of claim 9, wherein the one or more block lists are maintained by the user.

13. The method of claim 1, further comprising:
classifying the originator of the incoming communication as an important contact; and
responsive to classifying the originator as the important contact, determining that the first importance of the incoming communication is a highest level of importance.

14. The method of claim 1, further comprising:
updating the directory with usage data of the incoming communication, wherein the usage data includes at least one of communication duration, frequency, and bounce rate.

15. The method of claim 14, further comprising:
transmitting usage data of the incoming communication to a server, wherein the server collects usage data from multiple recipients of communications to update the importance of a contact and to maintain one or more block lists, and
receiving an updated importance of a contact and one or more updated block lists.

16. The method of claim 1, wherein the directory includes at least one of a social contact and a business contact associated with a social networking service user account of the user.

17. The method of claim 1, wherein the first set of rules comprises a first set of hierarchical rules, and wherein the second set of rules comprises a second set of hierarchical rules.

18. The method of claim 1, further comprising:
outputting, by the computing device, at least one of information about the originator of the incoming communication and a basis for the generated prioritization score.

19. A system comprising:
one or more processors;
a directory configured to store information about potential originators of incoming communications based on a location of the potential originators;
an originator identification module that identifies, based at least in part on an originating address of an incoming communication, an originator of the incoming communication; and
a message prioritization module operable by the one or more processors to apply a first set of rules to the identity of the originator of the incoming communication to determine a first importance of the incoming communication, wherein the first set of rules comprise rules generated based at least in part on information about the originator of the incoming communication included in a directory of the computing device, and wherein the directory includes location information about potential originators of incoming communications, and wherein the first importance of the incoming communication is based on a respective location of each of the potential originators and one or more of a geographic location of the computing device or a social location of a user of the computing device, apply a second set of rules to the identity of the originator of the incoming communication to determine a second importance of the incoming communication, wherein the second set of rules comprise rules generated based at least in part on previous interactions between the computing device and the originator of the incoming communication, wherein the previous interactions between the computing device and the originator of the incoming communication comprises the frequency of interaction between the originator of the incoming communication and the computing device, and generate a prioritization score based at least in part on the first importance of the incoming communication and the second importance of the incoming communication.

20. A non-transitory computer readable medium encoded with instructions that if executed by one or more programmable processors of a computing device cause the computing device to perform operations comprising:

determining, based at least in part on an originating address of an incoming communication, an identity of an originator of the incoming communication;

applying a first set of rules to the identity of the originator of the incoming communication to determine a first importance of the incoming communication, wherein the first set of rules comprise rules generated based at least in part on information about the originator of the incoming communication included in a directory of the computing device, and wherein the directory includes location information about potential originators of incoming communications, and wherein the first importance of the incoming communication is based on a respective location of each of the potential originators and one or more of a geographic location of the computing device or a social location of a user of the computing device;

applying a second set of rules to the identity of the originator of the incoming communication to determine a second importance of the incoming communication, wherein the second set of rules comprise rules generated based at least in part on previous interactions between the computing device and the originator of the incoming communication,. wherein the previous interactions between the computing device and the originator of the incoming communication comprises the frequency of interaction between the originator of the incoming communication and the computing device; and     generating a prioritization score based at least in part on the first importance of the incoming communication and the second importance of the incoming communication.

\* \* \* \* \*